July 6, 1926.
G. J. STEVENS
GEAR
Filed Nov. 24, 1925
1,591,794
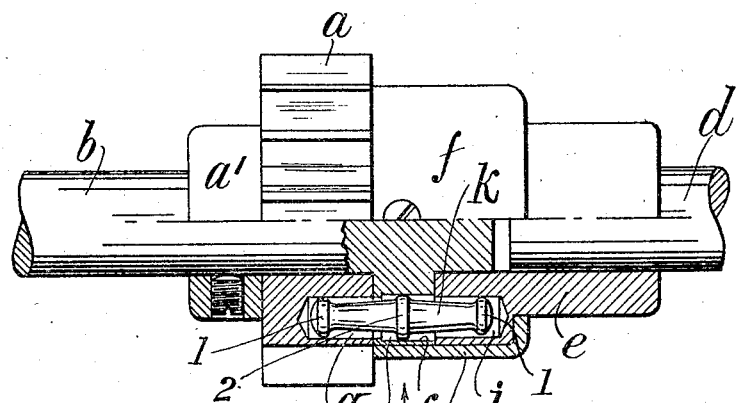
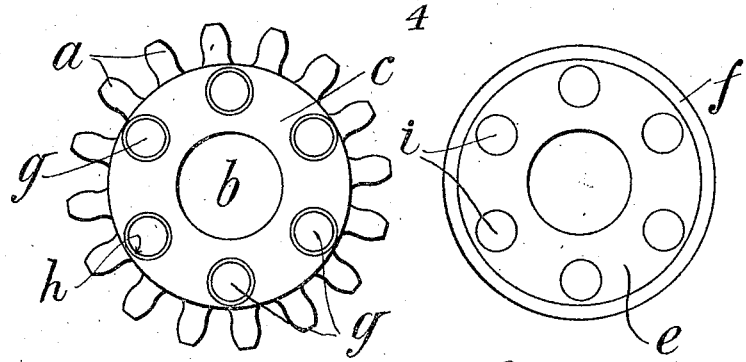
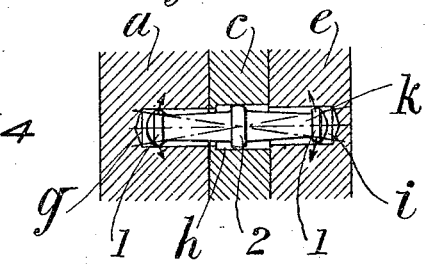
INVENTOR
G. J. STEVENS
BY
ATTORNEY Patented July 6, 1926.

1,591,794

UNITED STATES PATENT OFFICE.

GEORGE JOHN STEVENS, OF LONDON, ENGLAND.

GEAR.

Application filed November 24, 1925, Serial No. 71,184, and in Great Britain October 9, 1924.

This invention relates to rotary machines or parts of machines of the kind wherein gear comprising two toothed wheels in constant mesh have arranged upon their shafts other wheels also in constant mesh one of said other two wheels being the driving wheel. Such gears are well known for example in rotary pumps to which my invention is particularly applicable and the main object of the invention is to provide means whereby the wear on the wheels forming the pump proper is greatly reduced, the bulk of the stress and friction of driving being taken up by the two other wheels which are usually of finer mesh and arranged in a case or housing outside that which encloses the two pump wheels.

According to my invention I provide between the driving wheel and its pump wheel a flexible or differential connection of a kind which will adjust itself as the wear between the two exterior or gear wheels takes place.

As an example of this flexible or differential device I arrange the gear driving wheel and its pump wheel on separate shafts in alignment and I connect those shafts together by pins set substantially parallel with the shafts into sockets or recesses in flanges arranged on the shafts but provide in these sockets some slackness or play with the result that the drive of the one outer gear wheel on the other outer gear wheel takes practically all the stress or crash whilst the wheels forming the pump proper intermesh with very little friction or stress.

In practice the outer or gear wheels are of finer mesh than the pump wheels and as the finer teeth wear away the pins above-mentioned will shift slightly in their recesses or sockets and thus compensate for such wear as may have taken place on the teeth.

The invention is illustrated in the accompanying drawings, in which:—

Fig. 1 is a view in elevation partly in section showing the improved driving connection, Fig. 2 is a side elevation of the driving gear wheel, Fig. 3 is an elevation of the flanged sleeve, Fig. 4 is a sectional view partly in elevation of the connection.

A driving wheel $a$ is mounted loosely on the pump wheel driving shaft $b$, the shaft immediately beyond the driving wheel being circumferentially enlarged to provide a flange $c$. A collar $a'$ is secured to the driving shaft $b$ to hold the driving gear relative to the flange $c$. A driven shaft $d$ is arranged in alignment with the driving shaft $b$ and a flanged coupling $e$ is secured on the end of the driven shaft and is at least co-extensive diametrically. A dust cap $f$ overlies the flange $c$ and the coupling $e$.

In the use of the device as a pump drive the cooperating gear wheels may be mounted with relation to the shaft $d$, that is one being on the shaft and the other intermeshing with the shaft carried gear.

The differential connection forming the subject matter of the present invention consists in forming in the flange $c$ a series of annularly arranged openings $h$, the driving wheel $a$ and the coupling $e$ being formed with sockets $g$ and $i$. Levers $k$ are centrally mounted through the medium of a central bearing rib 2 on such levers in the openings $h$ of the flange $c$, the respective rounded ends $l$ of the levers being mounted in the openings $h$ and sockets $i$.

The drive from the motor or other source of power is of course transmitted through the levers, and the latter as shown are capable of a limited rocking movement, as will be plain from Fig. 4. In practice these levers are arranged substantially parallel with the shafts, and such levers in operation will permit a compensation in the relative movement of the wheel $a$ and its companion wheel, not shown, to thereby take up wear and hold the gears in close mesh without slackness or lash, to thereby keep the larger teeth of the pump wheels free from undue strain.

What I claim is:—

A driving gear for rotary pumps or the like comprising a driving shaft having a terminal flange, a driving gear loose on the shaft and bearing against the flange, a driven shaft in alignment with the driving shaft and carrying a gear, a coupling secured upon the end of the driven shaft and bearing against the terminal flange of the driving shaft, and inter-connecting levers mounted for rocking movement in openings in said flange with the lever terminals seating in sockets in the driving gear and in the coupling.

In testimony whereof I affix my signature.

GEORGE J. STEVENS.